Nov. 2, 1965 R. G. HEYL, JR 3,215,226
MOBILE UNIT
Filed April 13, 1962 2 Sheets-Sheet 1
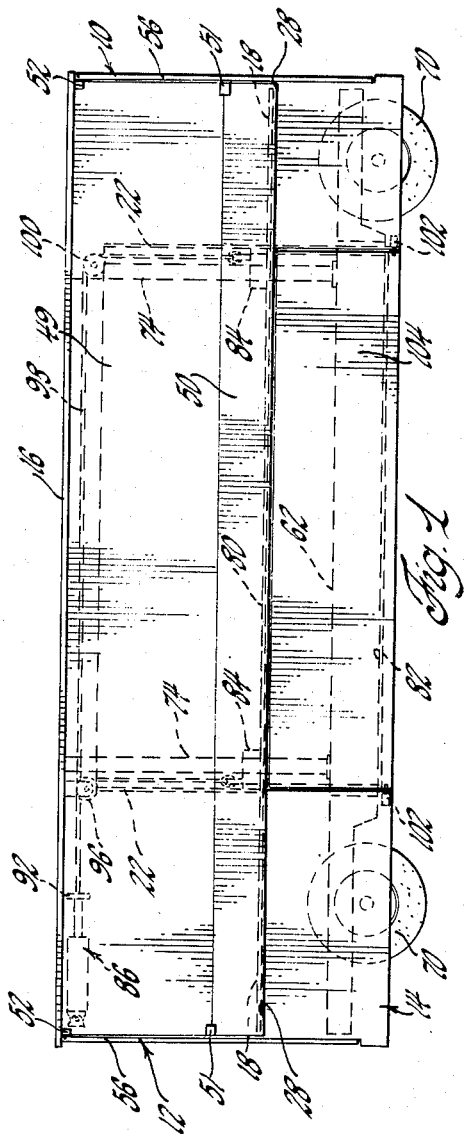
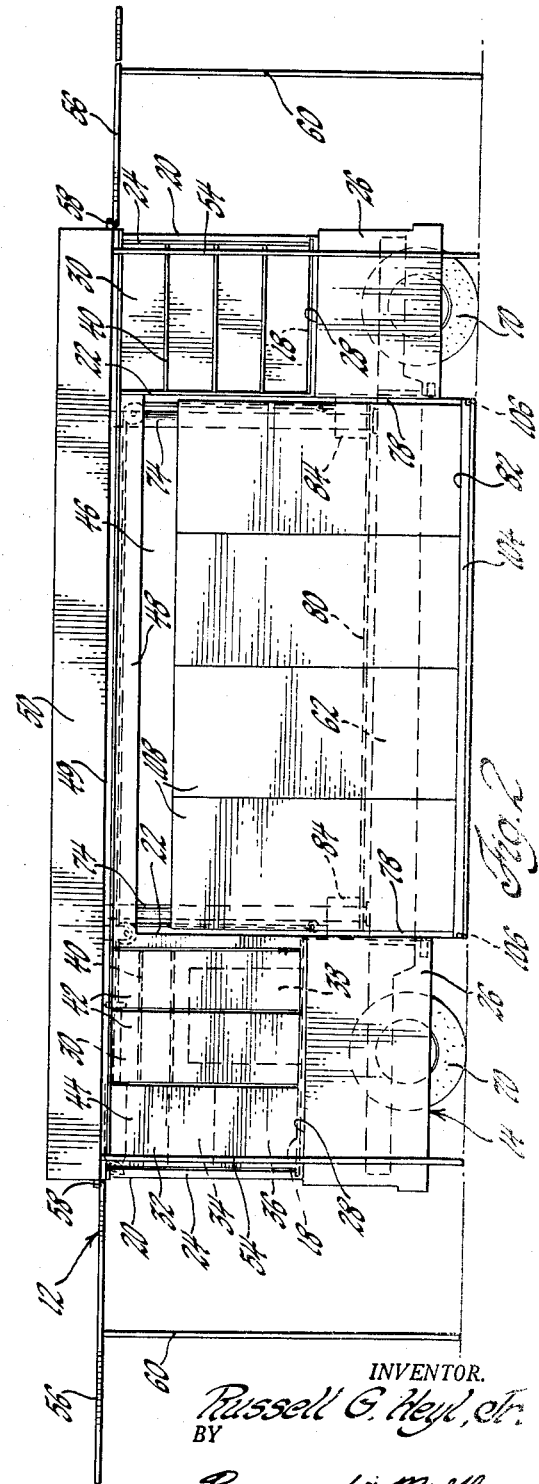
INVENTOR.
Russell G. Heyl, Jr.
BY
Barnard & McGlynn
ATTORNEYS

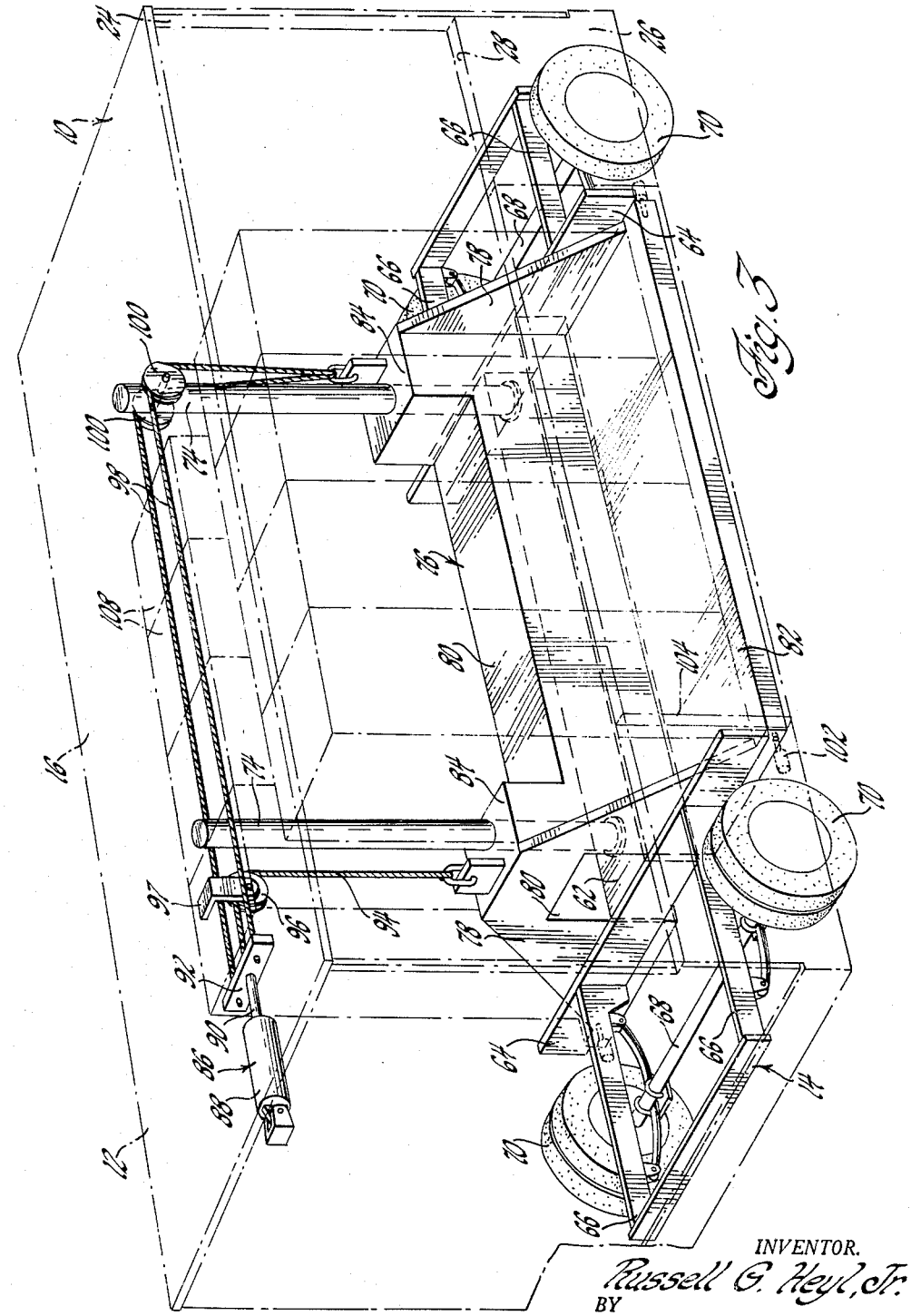

United States Patent Office 3,215,226
Patented Nov. 2, 1965

3,215,226
MOBILE UNIT
Russell G. Heyl, Jr., Birmingham, Mich., assignor to American Metal Products Company, Detroit, Mich., a corporation of Michigan
Filed Apr. 13, 1962, Ser. No. 187,375
13 Claims. (Cl. 187—9)

This invention pertains to a readily transportable or vehicular unit and, in particular, to an entirely self-contained mobile trailer-like unit adapted to be readily transported from one place of installation to another and to form a transportable housing for various activities such as automatic vending machines, washing and drying machines, health, innoculation and rescue centers, rest rooms, repair shops, radio and TV broadcast stations, test laboratories and the like.

While the present invention may be employed for various and sundry purposes as alluded to above, and as will become more apparent hereinafter, it was conceived and developed with particular reference to providing a mobile vending unit easily and quickly transportable from one place of installation to another for the purpose of vending and dispensing food, drinks and related items as demand or other requirements dictate. Therefore, the comments and description which follow will have particular and specific reference to the features and advantages of such a mobile unit utilized in a vending application as aforementioned in order to illustrate the invention, it being understood, of course, that the mobile unit may be utilized for other purposes such as aforementioned, as well as others.

With specific reference to the use of the mobile unit to be hereinafter described as a housing for automatic vending machines, it will be recognized that there are various types of activities in which it is extremely desirable, if not actually absolutely necessary, to provide food, drink and the like at a particular location on a temporary basis. For example, there is a real demand for food, drinks and the like, at sporting events such as football games, horse races, and the like, at rest and picnic areas now provided along the more limited access super highways, and in areas in which floods, fires and other disasters occur, and the like. To meet such needs, particularly with respect to sporting events, itinerant vendors are known to appear at such locations at the proper time for the purpose of selling their wares to spectators at such events. In some instances, mobile manned popcorn stands, hot dog stands and the like have also been utilized for this purpose, particularly in connection with sporting events.

However, and apart from the fact that manpower is required, such prior known mobile food dispensing units have been limited as to the locations in which they may be used simply because they are dependent upon outside sources for water, heat, light and other utilities. Furthermore, they are adapted for only one type of use and, in fact, are especially constructed for such one type of use, and further do not include means for protecting customers or other users of the unit from rain, snow and other elements. The present invention is directed to a solution of these and other problems in the mobile vending art, as well as to an improvement in mobile units in general which may be readily adapted for different uses and quickly and easily moved from one installation to another, and which are further characterized by a relatively compact transportable construction containing its own utilities which may be readily installed in a given location and then readily returned to a transportable compact condition for removal to a different location.

It is, therefore, a principal object and feature of this invention to provide an improved mobile unit of the type aforementioned which is of compact construction to facilitate transportation thereof from one site to another, and which may be readily set up or erected from said compact condition to an open construction at a given site where its use is demanded, and readily returned to its compact roadable condition when it is desired to transport the unit to another location.

It is yet another object and feature of this invention to provide a mobile trailer-like unit of general purpose utility, particularly adapted for housing a plurality of automatic vending machines, including closure members which normally enclose the interior of the unit or cover and protect the vending machines during transportation of the unit, but which may be readily moved to an open position permitting access to the interior of the mobile unit or to the vending machines upon installation of the unit at a particular site.

It is yet another object and feature of this invention to provide a mobile unit of the type aforementioned, particularly adapted to house a plurality of automatic vending machines, characterized by one or more substantially enclosed but accessible utility compartments for sources of heat, light, refrigeration and the like and for storage purposes, a generally open section for access to the interior of the unit and in which the vending machines may be mounted, and closure means operable between a position closing the open section of the unit during transportation of the latter and openable to permit access to the interior thereof or to the vending machines mounted therein while at the same time provide a roof for the protection of the users of the unit or the machines mounted therein.

It is yet another object and feature of this invention to provide a mobile vehicular unit comprising a chassis member including wheel means for transporting the unit, a body member mounted on the chassis member and being substantially enclosed except for an elongate access opening in at least one side thereof, but preferably both sides, and a vertically adjustably elevator means movable from a raised transportable position substantially wholly within the body member and a dropped or lowered position between the chassis member and ground level for ready access to the elevator means when the unit is installed at any given site.

It is yet another object and feature of this invention to provide a mobile vehicular unit of the type aforementioned in which said chassis member is further characterized by a longitudinally extending central torque tube means or box rigidly connected at its opposite ends to transversely extending frame members, and the aforementioned elevator means is substantially longitudinally coextensive with said torque tube means or box between the frame members of the chassis member for vertical movement therebetween, and is characterized by a longitudinally extending upstanding transom disposed opposite the aforementioned torque tube means or box and laterally projecting floor means projecting to either side thereof and particularly adapted to receive and support a plurality of vending machines between said transom and the edges of said floor means adjacent the access opening or openings in the side walls of the body member of the unit.

It is yet another object and feature of this invention to provide a mobile unit of the type aforedescribed further characterized by first and second closure members for each of the access openings provided on the body member and each such closure member having one end respectively hingedly connected to the body member and to the floor means of the elevator, said closure members being relatively movable between a closure position in which the other ends thereof matingly engage to close the access opening or openings in the body member and an open position in which the first closure member extends laterally outwardly from the body member to form a roof member over the access opening or openings and the second closure member extends laterally outwardly from the floor means of the elevator to form an ambulatory access member thereto with the elevator in its dropped or lowered position.

These and other objects, features and advantages of the invention will appear more fully hereinafter as the description of the invention proceeds, and in which reference is made to the drawings in which:

FIGURE 1 is a side elevation of a mobile unit constructed in accordance with a preferred embodiment of the invention, and showing the unit in the condition it assumes for transportation thereof;

FIGURE 2 is a view corresponding generally to FIGURE 1, but showing the unit installed in a given location; and FIGURE 3 is an enlarged perspective view of FIGURE 1 partly in phantom to illustrate certain details of the mobile unit.

Referring now to the drawings, the numeral 10 generally indicates a mobile unit constructed in accordance with this invention and comprising a body member indicated generally at 12 and a chassis member indicated generally at 14. The construction of the body member on each side thereof and to be described is substantially identical. Consequently only one side thereof is illustrated in FIGURES 1 and 2. The body member 12 comprises a longitudinally extending roof 16 and, spaced oppositely from the opposite ends thereof, the longitudinally spaced floor means 18. An outer end wall 20, inner wall 22 and oppositely spaced side wall members each including an upper portion 24 and a lower portion 26 are suitably rigidly interconnected and connected to opposite ends of the roof 16 and the respective floor means 18 so as to depend therebelow. It will be noted particularly from FIGURE 3 that the lower portion 26 of each of the side wall members extends laterally outwardly from the upper portion 24 thereof so as to form a shelf for ledge 28 on each side and at opposite ends of the body member.

The respective floor means 18 cooperate with the upper portions 24 of the side wall members and an upper portion of the outer end walls 20 and inner walls 22 and the ends of the roof 16 to form a utility compartment 30 at each end of the body member 12. FIGURE 2 illustrates such compartments as enclosing various elements such as, for example, a motor-generator unit 32, heating unit 34, sink unit 36, refrigerator or freezing unit 38 and laterally projectable shelving units 40. Each of the utility compartments includes utility openings communicating therewith through each of the upper portions 24 of the side wall members aforementioned. Thus, the utility compartment 30 at one end of the body member, or to the left in FIGURE 2, is of two part construction, one part including a utility opening adapted to be closed by a pair of hinged doors indicated at 42 swingable toward and away from each other for access to the refrigerator or freezer unit 38 as well as the shelving units 40, while a single door closure 44 is similarly hinged to close a utility opening on each side of the body member to the motor-generator, heating and sink units. The shelving units 40 at the other end of the body member communicate with utility openings on each side thereof which, in this instance, are not provided with cooperating doors as described above. Finally, and referring particularly to FIGURE 2, the aforedescribed side wall members at each end and on each side of the body member 12 define access openings 46 to the interior thereof below the lower edge of a wall member 48 substantially forming an extension of and between the upper portions 24 of each of the side wall members aforedescribed.

A combined roof and closure member 49 including a longitudinally coextensive flap member 50 hinged to one edge thereof as indicated at 51 is provided on each side of the body member, and each has the other edge thereof suitably hingedly connected adjacent the roof 16 as indicated at 52 so as to be movable between a closure position as illustrated in FIGURE 1 and a raised position as illustrated in FIGURE 2 forming a roof-like canopy on each side of the body member of the unit with the flap member 50 upstanding therefrom for use as a sign. Means such as rods 54 extending from the ground and engaging the flap members 50 are utilized to prop the combined roof and closure members in their roof-forming positions. It will be noted that the combined roof and closure members are substantially coextensive with the length of the body member 12 and particularly the roof 16 thereof so that, in the closure position as illustrated in FIGURE 1, they form closures over the doors 42 and 44 at one end of the body member and directly over the utility openings and shelving units 40 therein in the compartment at the other end thereof. It will also be noted that the central portions of the combined roof and closure members form portions of closures for the central access openings 46 in the body member between the utility compartments 30, and that in their closure positions the edges of the flap members 50 thereof nest on the ledges or shelves 28 joining the upper and lower portions 24 and 26 of each of the side wall members as aforedescribed.

A pair of end flaps 56 each have their upper ends suitably hingedly connected as indicated at 58 in FIGURE 2 at respective ends of the body member 12 adjacent roof 16 so as to have a transporting position adjacent the outer end walls 20, but being movable outwardly of the positions illustrated in FIGURE 1 to that of FIGURE 2 to form additional roof structures to protect users or customers of the mobile unit. Again, means such as rods 60 are adapted to be interposed between the end flaps and the ground to hold them in their roof-forming positions upon installation of the unit in any given location, and may be readily removed to drop the aforementioned flaps into the closed position as illustrated in FIGURE 1. Perhaps needless to mention, suitable means may be provided for latching the end flaps in the position illustrated in FIGURE 1 during transportation of the mobile unit.

The chassis member 14 includes a central longitudinally extending rectangular torque tube or box 62 rigidly connected at its opposite ends to transversely extending frame members 64 each of which includes a pair of spaced longitudinally extending rail members 66 on which an axle 68 supporting the road wheels 70 may be mounted or suspended in any desired and suitable manner. The body member 12 is suitably rigidly mounted on the chassis member 14 with the inner wall members 22 of the body member respectively adjacent chassis frame members 64, the floor means 18 of the body member and the utility compartments 30 respectively disposed substantially over the road wheels 70 longitudinally beyond respective chassis frame members 64, and the respective access openings 46 on each side of the body member extending substantially longitudinally coextensive with the aforedescribed torque tube or box.

A pair of longitudinally spaced vertical guide posts 74 extend between and have their opposite ends suitably rigidly secured to the roof 16 of the body member and the torque tube or box 62 of the chassis member so as to be spaced somewhat longitudinally inwardly from the inner walls 22 of the body member. An elevator member indicated generally at 76 is substantially longitudinally coextensive with the torque tube or box 62 and access openings 46 between the utility compartments 30, and comprises a pair of longitudinally spaced support plates 78 rigidly connected to a central longitudinally extending upstanding transom 80 of generally inverted U-shaped configuration and floor means 82 projecting laterally to either side thereof. A suitable guide bearing 84 including an opening slidably receiving the respective guide posts 74 is provided at each end of the transom 80 adjacent the respective support plates 78 to vertically adjustably mount the elevator member with the transom thereof opposite the torque tube or box 62.

Means are provided for vertically adjusting the position of the elevator member 76 on the guide posts 74 and relative to the body and chassis members, and comprises a fluid pressure operated jack 86 comprising a cylinder element 88 suitably secured to the body member 12 adjacent the roof 16 and a piston element including piston rod 90 reciprocably disposed therein and connected to a cross head 92. A flexible cable 94 has one end suitably connected to the upper end of one of the support plates 78, is reeved about a pulley 96 rotatably supported from a bracket 97 secured to roof 16, and has the other end thereof secured to cross head 92. In similar fashion, the bight of cable 98 is suitably connected to the other support plate 78, and the two strands thereof are reeved about the guide pulleys 100 suitably rotatably mounted on the upper end of the associated guide post 74 adjacent the roof 16, and have their other ends secured to the cross head 92.

As will be apparent, a suitable fluid circuit including selector valve means is provided to control actuation of the jack 86 and raising and lowering movement of the elevator member 76 between the raised transportable position illustrated in FIGURES 1 and 3 in which the elevator member is substantially entirely contained within the confines of the body member 12 with the floor means 82 thereof extending between the torque tube or box 62 and chassis frame members 64 to close off the bottom of the body member within the confines of the respective access openings 46, and a lowered position as illustrated in FIGURE 2 in which the elevator member and particularly the floor means thereof is dropped below the chassis member 14 and substantially to ground or curb level. Means such as the latch members indicated schematically at 102 are provided on each end of each of the chassis frame members 64 for cooperation with an adjacent portion of the respective support plates 78 of the elevator member to latch or lock the latter in its raised position.

A combined closure and ramp member 104 is provided for each side of body member 12, and each has one edge thereof suitably hingedly connected to the laterally outer edges of the floor means 82 of the elevator member as indicated at 106 in FIGURE 2. Each closure and ramp member is adapted to be swung to the closure position illustrated in FIGURE 1 with the elevator member in its raised position, and in which the other end thereof mates with the central portion of the flap member 50 of the cooperating combined roof and closure member 49 to form a closure for the access opening in each side of the body member 12. Upon dropping or lowering of the elevator member as previously described, each ramp and closure member 104 may also be swung downwardly to the position illustrated in FIGURE 2 to provide an ambulatory access up to the access openings 46 of the body member and the floor means 82 of the elevator member on each side of the mobile unit. Again, it may be noted that suitable latching means may be provided to latch the closure members 49 and 104 in the position illustrated in FIGURE 1 during transportation of the unit.

A plurality of vending machines of the automatic variety are illustrated schematically at 108 as being aligned and in substantially abutting side-by-side engagement with each other and respective sides of the transom 80, and as resting on the elevator floor means 82 to either side thereof. Furthermore, the vending machines extend substantially entirely the length of the elevator floor means between the utility compartments 30 to fill the access openings 46 on each side of the body member. The front surfaces of the vending machines are displaced laterally inwardly of the outer edges of the respective floor means of the elevator member so that the upper ends thereof will pass slightly inwardly of the wall member 48 upon moving the elevator member to its raised position. In this regard, it will be readily apparent that other arrangements of the vending machines on either side of the transom member may also be made.

As will now be apparent, the mobile unit 10 is adapted to be towed by a suitable prime mover to a given location for installation, and the fluid pressure operated jack 86 operated to drop the elevator member 76 relative to the body and chassis members so as to disposed the floor means 82 thereof below the chassis member at substantially ground or curb level. In so dropping the elevator member, the transom 80 drops around the torque tube or box 62. Thereafter, the combined roof and closure members 49 and the combined ramp and closure members 104 may be moved to the positions illustrated in FIGURE 2 to provide access to the vending machines 108 mounted on the floor means of the elevator member. At the same time, the end flaps 56 may also be elevated to the positions illustrated in FIGURE 2. Thus, customers for the vending machines find ready access thereto from either side of the mobile unit, and are protected from the elements while using such machines, and they may move from the vending machines under the end flaps 56 while consuming their purchases. Should it be desired to service the vending machines or to remove them, this may be readily accomplished due to the substantially ground level location thereof with the unit lowered. Furthermore, the unit may be installed in practically any otherwise feasible location since it contains its own utilities. When it is desired to transport the mobile unit to another location, the rods 54 and 60 are quickly and easily removed to lower the various flaps and closure members aforedescribed, the fluid pressure operated jack 86 operated so as to elevate the elevator member to its raised transportable position and the latches 102 engaged. The combined ramp and closure members 104 may then be moved to their closure positions and suitably latched to the combined roof and closure members 49. In this regard, it will be noted again that, with the closure members 49 and 104 in the positions of FIGURE 1 for towing of the unit, the closure members 49 nest along the ledges or shelves 28 and that such closure members conceal and protect the upper side wall portions 24 forming a part of the utility compartments 30 and, particularly in this regard, prevents the shelving in units 40 stored in the utility compartment at the right in FIGURE 2, from being thrown out during movement of the unit. Furthermore, the central portions of the combined roof and closure members cooperate with the combined ramp and closure members to form a complete closure for the access openings 46 on each of the body members, and completely encloses and conceals the vending units 108 and the interior of the body member from view. Hence, the mobile unit may be easily and quickly closed up for towing the unit to a subsequent location.

While but one form of the invention has been shown and described, other forms will now be apparent to those skilled in the art. Therefore, it is to be understood that the embodiment shown in the drawings is merely for illustrative purposes, and is not intended to limit the scope of the invention which is defined by the claims which follow.

I claim:
1. A mobile vehicular unit comprising a chassis member, wheel means mounted on said chassis member for transporting said unit, a body member mounted on said chassis member, a pair of spaced vertical guide posts extending between and respectively rigidly secured to said chassis member and body member within the latter, an elevator member including a pair of spaced end portions respectively slidably mounted on said guide posts for raising and lowering movement of said elevator member between a lowered position disposed below said chassis member and a raised transportable position substantially wholly within said body member, and operating means for raising and lowering said elevator member between said positions thereof.

2. The invention as defined in claim 1 in which said operating means comprises a fluid pressure operated jack mounted within said body member and including relatively reciprocable piston and cylinder elements, one of said elements being connected to said body member, and means connecting the other of said elements to said end portions of said elevator member.

3. The invention as defined in claim 2 wherein said last-named connecting means comprises a pair of guide pulley means mounted within said body member respectively adjacent to said guide posts, a head member secured to said other element of said jack, a first length of operating cable having both ends thereof secured to said head member and a bight portion thereof connected to one of said end portions of said elevator member, said first length of operating cable being reeved over one of said pulley means, and a second length of operating cable having one end thereof fixed to said head member and the other end thereof connected to the other of said end portions of said elevator member, said second length of cable being reeved over the other of said pulley means.

4. A mobile vehicular unit comprising a chassis member including longitudinally extending central torque tube means having a transversely extending frame member rigidly connected at opposite ends thereof, wheel means mounted on each end of said chassis member longitudinally beyond said respective frame members for transporting said unit, a body member mounted on said chassis member, an elevator member including a longitudinally extending upstanding central transom disposed opposite from said torque tube means and floor means extending transversely therefrom, and means vertically adjustably mounting said elevator member for raising and lowering movement thereof relative to said body and chassis members between a lowered position in which said floor means is disposed below said frame members and a raised transportable position substantially wholly within said body member with said floor means substantially between said frame members.

5. The invention as defined in claim 4 in which said means vertically adjustably mounting said elevator member comprises a pair of longitudinally spaced vertical guide posts extending between said torque tube means and said body member, and said elevator member includes longitudinally spaced end portions respectively slidably mounted on said guide posts.

6. The invention as defined in claim 4 further comprising a plurality of vending machines mounted on said elevator floor means adjacent said transom.

7. A mobile vehicular unit comprising a chassis member including longitudinally extending central torque tube means having a transversely extending frame member rigidly connected at opposite ends thereof, wheel means mounted on each end of said chassis member longitudinally beyond said respective frame members for transporting said unit, a body member mounted on said chassis member and including longitudinally spaced side wall members on one side thereof to form an access opening therebetween to the interior of said body member substantially longitudinally coextensive with said torque tube means, an elevator member including a longitudinally extending upstanding central transom disposed opposite from said torque tube means and floor means extending transversely therefrom, means vertically adjustably mounting said elevator member for raising and lowering movement thereof relative to said body and chassis members between a lowered position in which said floor means is disposed below said frame members and a raised transportable position substantially wholly within said body member with said floor means substantially between said frame members, and first and second closure members for said access opening each having one end respectively hingedly connected to said body member and to said floor means, said first and second closure members being relatively movable between a closure position in which the other ends thereof matingly engage to close said access opening with said elevator member in said raised transportable position and an open position in which said first closure member extends laterally outwardly from said body member to form a roof member over said access opening and said second closure member extends laterally outwardly from said floor means to form an ambulatory access member thereto with said elevator member in said lowered position.

8. The invention as defined in claim 7 in which at least one of said side wall members includes a utility opening, and said first closure member forms a closure for said utility opening in said closure position thereof.

9. The invention as defined in claim 7 further comprising a plurality of vending machines mounted on said elevator floor means between said transom and said access opening in said body member.

10. A mobile vehicular unit comprising a chassis member including longitudinally extending central torque tube means having a transversely extending frame member rigidly connected at opposite ends thereof, wheel means mounted on each end of said chassis member longitudinally beyond said respective frame members for transporting said unit, a body member mounted on said chassis member and including roof means extending longitudinally thereof and longitudinally spaced floor means respectively disposed at each end of said body member over said wheel means, means including longitudinally spaced side wall members on one side of said body member interconnecting said roof means and said respective floor means to form a utility compartment at each end of said body member and an access opening therebetween to the interior of said body member substantially longitudinally coextensive with said torque tube means, an elevator including a longitudinally extending upstanding central transom disposed opposite said torque tube means and floor means extending transversely therefrom, means vertically adjustably mounting said elevator for raising and lowering movement thereof relative to said body and chassis members between a lowered position in which said elevator floor means is disposed below said frame members, and a raised transportable position substantially wholly within said body member with said elevator floor means substantially disposed between said frame members, and first and second closure members for said access opening each having one end respectively hingedly connected to said body member adjacent said roof means and to said elevator floor means, said first and second closure members being relatively movable between a closure position in which the other ends thereof matingly engage to close said access opening with said elevator in its raised transportable position and an open position in which said first closure member extends laterally outwardly from said roof means to form a roof member over said access opening and said second closure member extends laterally outwardly from said elevator floor means to form an ambulatory access member thereto with said elevator in its lowered position.

11. The invention as defined in claim 10 in which said means vertically adjustably mounting said elevator comprises a pair of longitudinally spaced vertical guide posts extending between said torque tube means and said roof means, said elevator including longitudinally spaced end portions respectively slidably mounted on said guide posts, guide pulleys mounted on each of said guide posts adjacent said roof means, a fluid pressure operated jack including relatively reciprocable piston and cylinder elements having one element thereof mounted within said body member adjacent said roof means, and means including operating cables reeved about said guide pulleys and connecting the other element of said jack to said end portions of said elevator.

12. The invention as defined in claim 10 in which said side wall members include utility openings to the interiors of said respective utility compartments, and said first closure member is substantially longitudinally coextensive with said roof means and forms a closure for said utility openings in said closure position thereof.

13. The invention as defined in claim 10 further comprising a plurality of vending machines mounted on said elevator floor means between said transom and said access opening in said body member.

References Cited by the Examiner
UNITED STATES PATENTS

| | | | |
|---|---|---|---|
| 586,641 | 7/97 | Underwood | 187—95 X |
| 1,180,206 | 4/16 | Takacs | 214—75 |
| 2,560,715 | 7/51 | Bill | 180—89 |
| 2,591,544 | 4/52 | Hegarty. | |
| 2,621,811 | 12/52 | Lull | 214—75 |
| 2,636,746 | 4/53 | Meldrum | 280—43.22 |
| 2,648,546 | 8/53 | Falkenhagen | 280—43.23 X |
| 2,772,010 | 11/56 | Buehring | 254—189 X |
| 2,792,079 | 5/57 | Gibson | 187—9 |
| 2,829,785 | 4/58 | Pitts | 214—75 |

SAMUEL F. COLEMAN, *Primary Examiner.*
ANDRES H. NIELSEN, *Examiner.*